(12) United States Patent
Gregory

(10) Patent No.: US 8,517,445 B1
(45) Date of Patent: Aug. 27, 2013

(54) SECURITY DECK ENCLOSURE SYSTEM

(76) Inventor: Shawn Gregory, Cortez, CO (US)

( * ) Notice: Subject to any disclaimer, the term of this patent is extended or adjusted under 35 U.S.C. 154(b) by 0 days.

(21) Appl. No.: 13/601,913

(22) Filed: Aug. 31, 2012

Related U.S. Application Data

(63) Continuation of application No. 12/799,068, filed on Apr. 16, 2010, now Pat. No. 8,256,819.

(51) Int. Cl.
*B60N 3/12* (2006.01)

(52) U.S. Cl.
USPC ...................................................... 296/37.16

(58) Field of Classification Search
USPC ........................... 296/37.16, 37.6, 193.08, 50
See application file for complete search history.

(56) References Cited

U.S. PATENT DOCUMENTS

| | | | | | |
|---|---|---|---|---|---|
| 2,767,896 | A | * | 10/1956 | Beck | 224/541 |
| 5,324,089 | A | * | 6/1994 | Schlachter | 296/37.5 |
| 6,065,794 | A | * | 5/2000 | Schlachter | 296/37.6 |
| 6,155,625 | A | * | 12/2000 | Felix | 296/37.14 |
| 6,305,730 | B1 | * | 10/2001 | Stone | 296/37.6 |
| 6,435,586 | B2 | * | 8/2002 | Getzschman et al. | 296/37.6 |
| 6,959,955 | B2 | * | 11/2005 | Carter et al. | 296/37.6 |
| 7,438,338 | B1 | * | 10/2008 | Schumacher et al. | 296/37.6 |
| 7,731,260 | B2 | * | 6/2010 | Heller | 296/50 |
| 2007/0284907 | A1 | * | 12/2007 | Yue | 296/100.06 |

* cited by examiner

*Primary Examiner* — Kiran B Patel

(57) ABSTRACT

A device and method for creating a storage enclosure in a vehicle having a cargo area is disclosed. The device includes a locking mechanism includes a forward aperture of a length and an aft aperture of that is shorter than the forward aperture. The arrangement allows removal of the top panel from the locking mechanism by moving the top panel aft until the aft bushing moves out of the aft aperture, allowing the aft edge to be lifted from the aft aperture, and thus allowing the top panel to be positioned where the forward bushing may be removed from forward aperture in the forward plate or simply held at an angle to the cargo area.

3 Claims, 6 Drawing Sheets

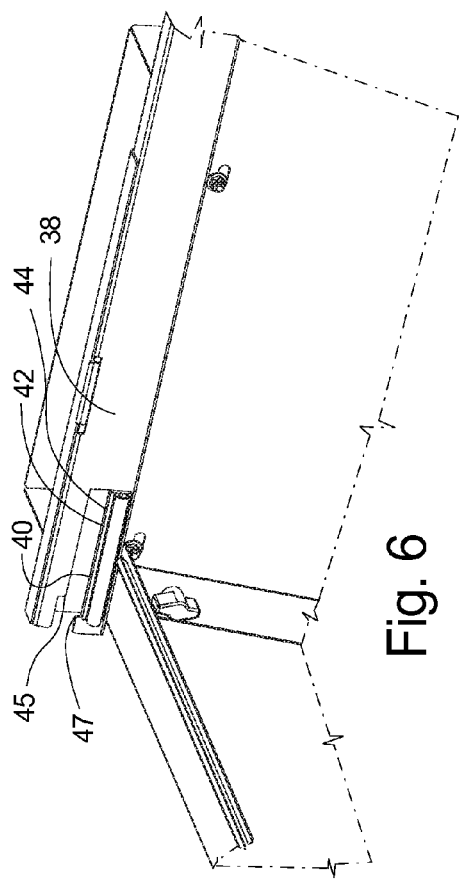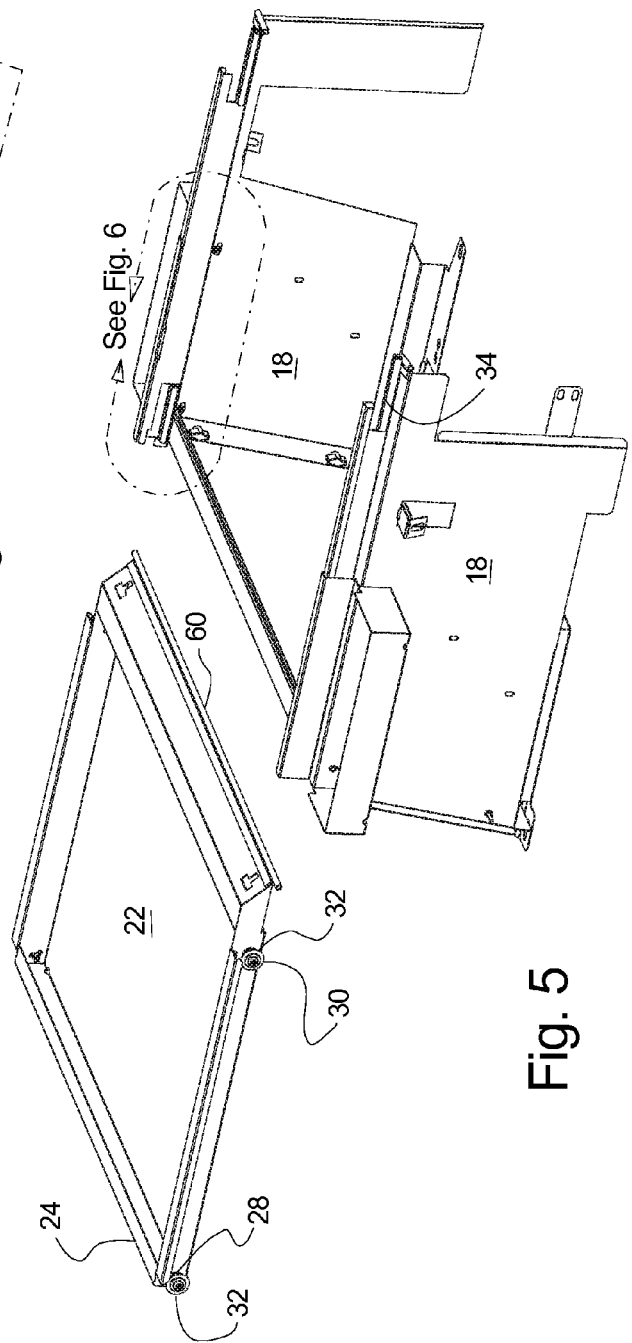

SECURITY DECK ENCLOSURE SYSTEM

REFERENCE TO RELATED APPLICATIONS

This application is a continuation of my application titled "SECURITY DECK ENCLOSURE SYSTEM" having Ser. No. 12/799,068, filed on Apr. 16, 2010, now U.S. Pat. No. 8,256,819, which is incorporated herein in its entirety by reference.

BACKGROUND OF THE INVENTION (a) Field of the Invention

This application relates to a device and method for creating an enclosed space and cargo deck in a vehicle with a locking tailgate. More particularly, but not by way of limitation, to a device and system for forming a lockable storage enclosure and loading deck that takes advantage of the structure found in a sport utility vehicle such as a Jeep® Wrangler®.

(b) Discussion of Known Art

The popular style of sport utility vehicle sold under the trademark Jeep® Wrangler® by the Chrysler® Corporation of Auburn Hills, Mich., is offered with a convertible top, which allows the user to enjoy open-air driving. The removal of the top, or the use of a fabric top, leaves the contents of the vehicle vulnerable to theft. Thus, there is a need for providing a system that allows a user to store items in such a vehicle in a secure manner.

The need for a storage device in the Jeep® convertible vehicle has spawned the creation of devices such as the security enclosure shown in U.S. Pat. No. 4,938,519 to Schlachter, incorporated herein in its entirety by reference, U.S. Pat. No. 6,305,730 to Schlachter, and U.S. Pat. No. 7,438,338 to Schumacher et al., also incorporated herein in its entirety by reference. However, known approaches have been unable to solve the long-felt need for a device that combines simplicity and versatility with security. For instance, the high level of security and simplicity provided by U.S. Pat. No. 4,938,519 to Schlachter is limited by the absence of a removable top portion or lid that allows the device to be opened or accessed from the top. Similarly, the addition of a hinged lid as disclosed in U.S. Pat. No. 6,305,730 to Schlachter provides security through a latch mechanism that requires the mounting of a mating female receiver from the tailgate of the vehicle, and thus complicating the overall design with the addition of components.

Therefore, a review of known devices reveals that there remains a need for a simple device that provides a versatile and secure storage compartment for vehicles having an open cargo area with side panels and a tailgate, such as the cargo area found in the convertible Jeep® Wrangler® vehicle.

SUMMARY

It has been discovered that the problems left unanswered by known art can be solved by providing a system for creating a storage enclosure in a vehicle having a cargo area, the cargo area being defined by a floor a pair of spaced apart sidewalls, and a tailgate, the system including:

A top panel having forward edge and an aft edge, the top panel further comprising a forward bushing mounted from the top panel at a location near the forward edge, and an aft bushing that is mounted from the top panel at a location near the aft edge;

An end panel; and

A locking mechanism comprising:

A forward plate having a forward aperture having sides adapted for accepting the forward bushing and having a travel portion along the sides of the forward aperture, the sides of the forward aperture extend from the forward edge towards the aft edge and retain the forward bushing as it moves along the travel portion of the forward aperture, the forward aperture having a release aperture that allows the forward bushing to be removed from the forward plate;

An aft plate connected to the forward plate, the aft plate having an aft aperture adapted for accepting the aft bushing, the aft aperture being adapted for accepting the aft bushing and having a travel portion of a length that extends between the forward edge and the aft edge, the aft aperture having a stop that allows the forward bushing to travel along the aft aperture until the stop prevents the aft bushing from advancing towards the forward plate and the forward bushing is at a position in the forward aperture where the forward bushing is prevented from fully entering the release aperture, so that removal of the top panel from the locking mechanism is accomplished by moving the top panel aft until the aft bushing moves out of the aft aperture, allowing the aft edge to be lifted from the aft aperture allowing the top panel to be move forward to a position where the forward bushing may move through the release aperture.

It will be understood that the disclosed invention will cooperate with the tailgate of the vehicle, and use the locking mechanism of the tailgate to provide security for items secured in the storage area defined as the space between the end panel, the top panel, the sidewalls of the vehicle's bed, and the floor of the vehicle's bed. The closing of the tailgate will prevent the top panel from sliding in a forward or aft direction. By preventing excessive movement in towards the aft end of the vehicle the disclosed system prevents the aft bushing from being removed from the aft aperture, which in turn also prevents the forward bushing from being removed from the forward aperture. Once the tailgate is opened or lowered, then the top panel will be free to be slid in an aft direction to a position where the aft bushing exits the aft aperture, and thus freeing the top panel to be slid forward to a position where the forward bushing may be slid into the release aperture, allowing the entire top panel to be removed. Of course, it is contemplated that just lifting the aft edge of the top panel will provide access to the storage space.

It is also contemplated that the disclosed locking mechanism will use bushings that slide along a pair of tracks to retain the top panel on the tracks and allow forward-aft movement of the top panel relative to the bed of the vehicle. At least one of the tracks has an aperture that allows removal of the bushings from the track at a specific location along the track. The aperture in the track is positioned at a location that prevents release of any of the bushings from either of the tracks when the tailgate is closed. Thus, the system uses the locking mechanism of tailgate to keep the top panel captured by the tracks to prevent access to the storage area when the tailgate is closed.

It will also be understood that the disclosed system allows complete removal of the top panel to allow use of the bed without the height limitations of a system that has a lid that is fastened through a permanent hinge.

Still further, it is contemplated that the top panel of the disclosed invention creates a convenient load deck that can be used to carry loads. Additionally, the ease with which the top panel can be removed adds versatility in that a manufacturer can provide the user with top panels that incorporate carrying or attachment devices for carrying specific types of items. For instance, one top panel may incorporate baskets or recessed areas or drawers for carrying small items to be held within easy reach. Another top panel may be of high structural rigidity with a simple flat surface designed to support heavy items.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 5 illustrates the removal of the top panel and an example of the arrangement of the forward aperture and aft aperture.

FIG. 6 is a close-up view of a preferred example of the forward aperture and the arrangement of the release aperture relative to the forward aperture in a highly preferred example of the invention.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
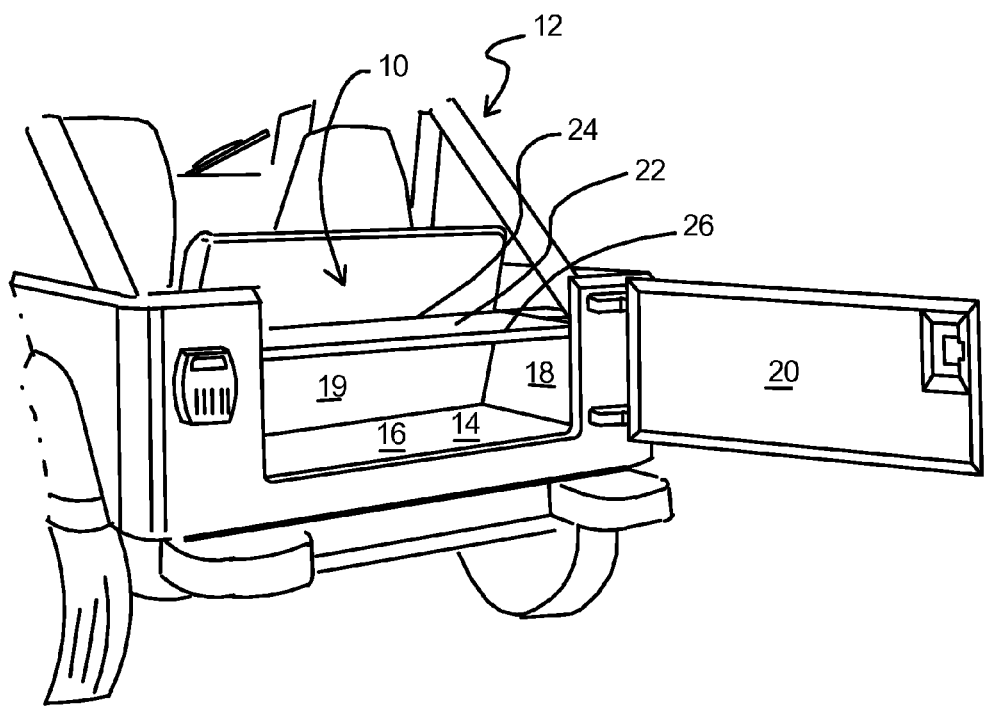
FIG. 1 is a perspective view of an embodiment of the invention while in use in a sport utility vehicle.

Turning now to FIG. 1 where a storage enclosure 10 is shown mounted in a vehicle 12 having a cargo area 14. The cargo area 14 being defined by a floor 16, a pair of spaced apart, an endwall 19, which in the illustrated example is simply the back 21 of the seat 23. The cargo area 14 in the illustrated example is also bound by a tailgate 20 that is adapted for extending between the floor 16 and the spaced apart sides 17. The tailgate 20 has been illustrated as being hinged in a manner that will allow the tailgate to swing out about a vertical axis, but it is contemplated that the inventive aspects disclosed here may be used on vehicles that have a tailgate that pivots about a horizontal axis, as in many pickup trucks.

Turning now to FIGS. 2-7, it will be understood that the disclosed storage enclosure 10 will preferably include a top panel 22 that has a forward edge 24 and an aft edge 26. The use of the words "forward" and "aft" have been selected for use here because they allow the reader to orient the contemplated preferred orientation of the device when in use in the cargo area 14 of the vehicle 12. The front of the vehicle 12 will be at the front of the vehicle and the rear or aft portion of the vehicle will be behind the front of the vehicle.

Figure 2:
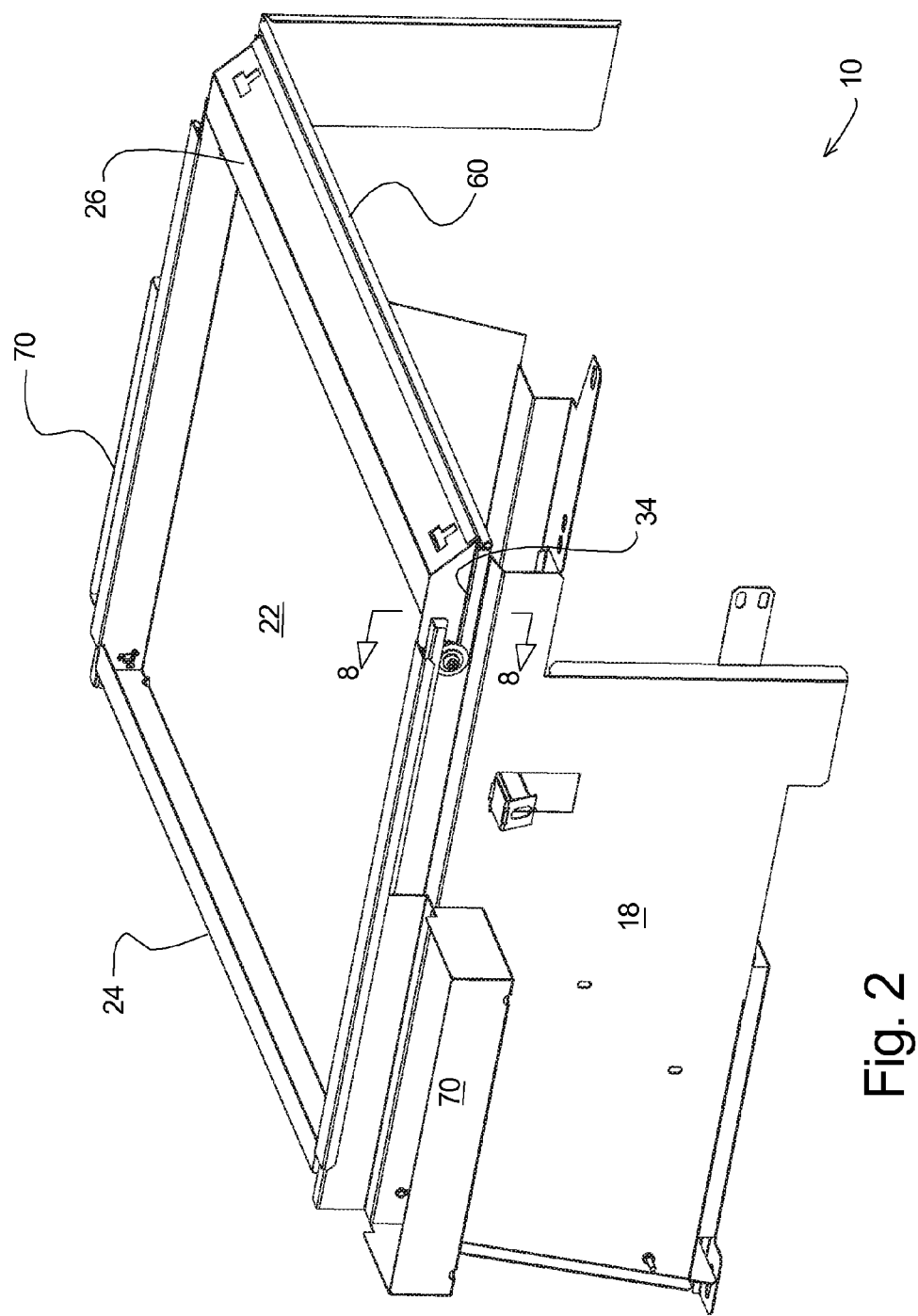
FIG. 2 illustrates a highly preferred embodiment of the invention in the closed, locked position. The embodiment is shown with fastening hardware or fittings that are used to firmly fasten the device to the sport utility vehicle, and additional removable storage trays 70.
Figure 3:
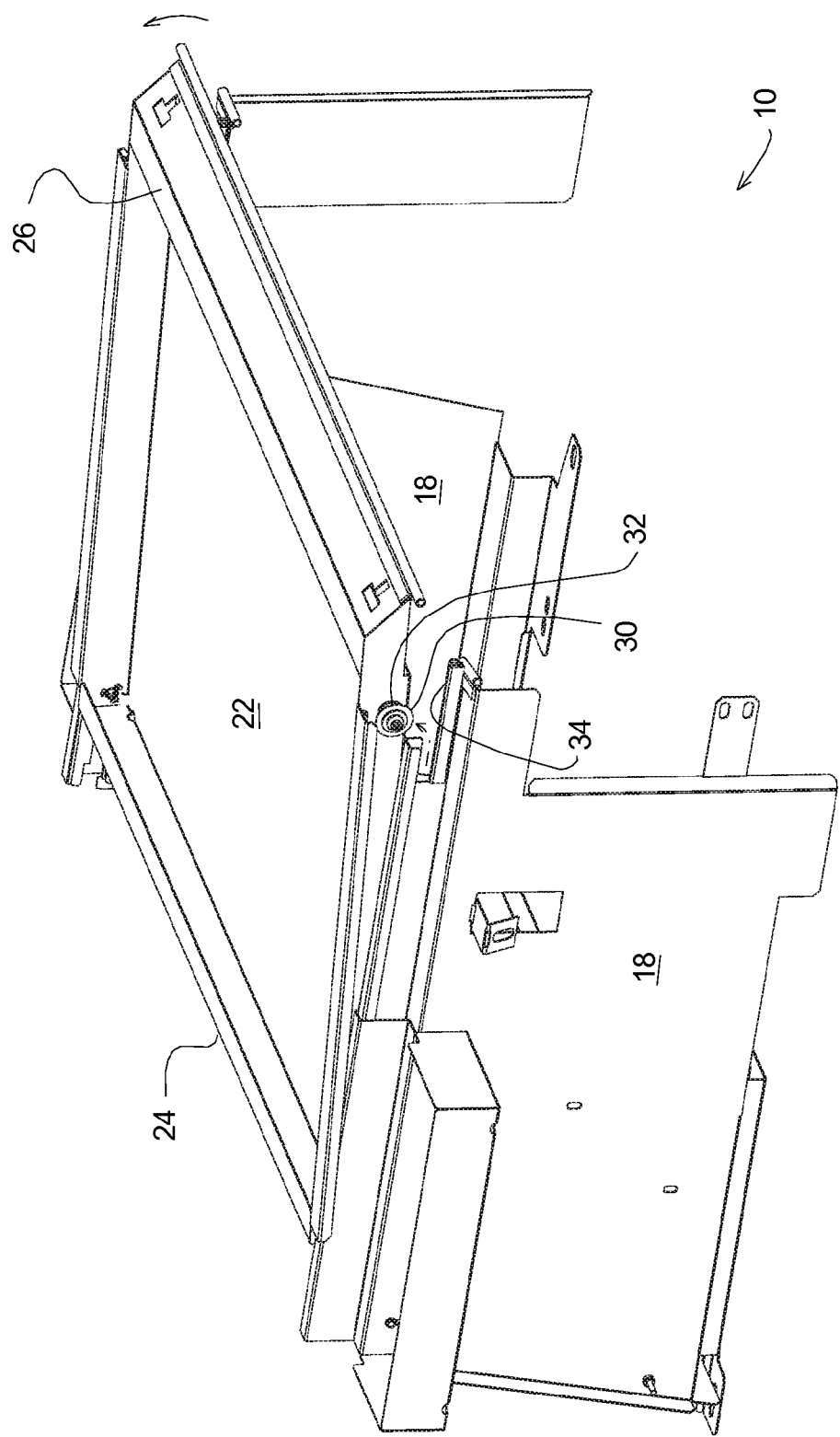
FIG. 3 is a close-up view of a preferred example of the aft aperture and aft bushing attached to the top panel.
Figure 4:
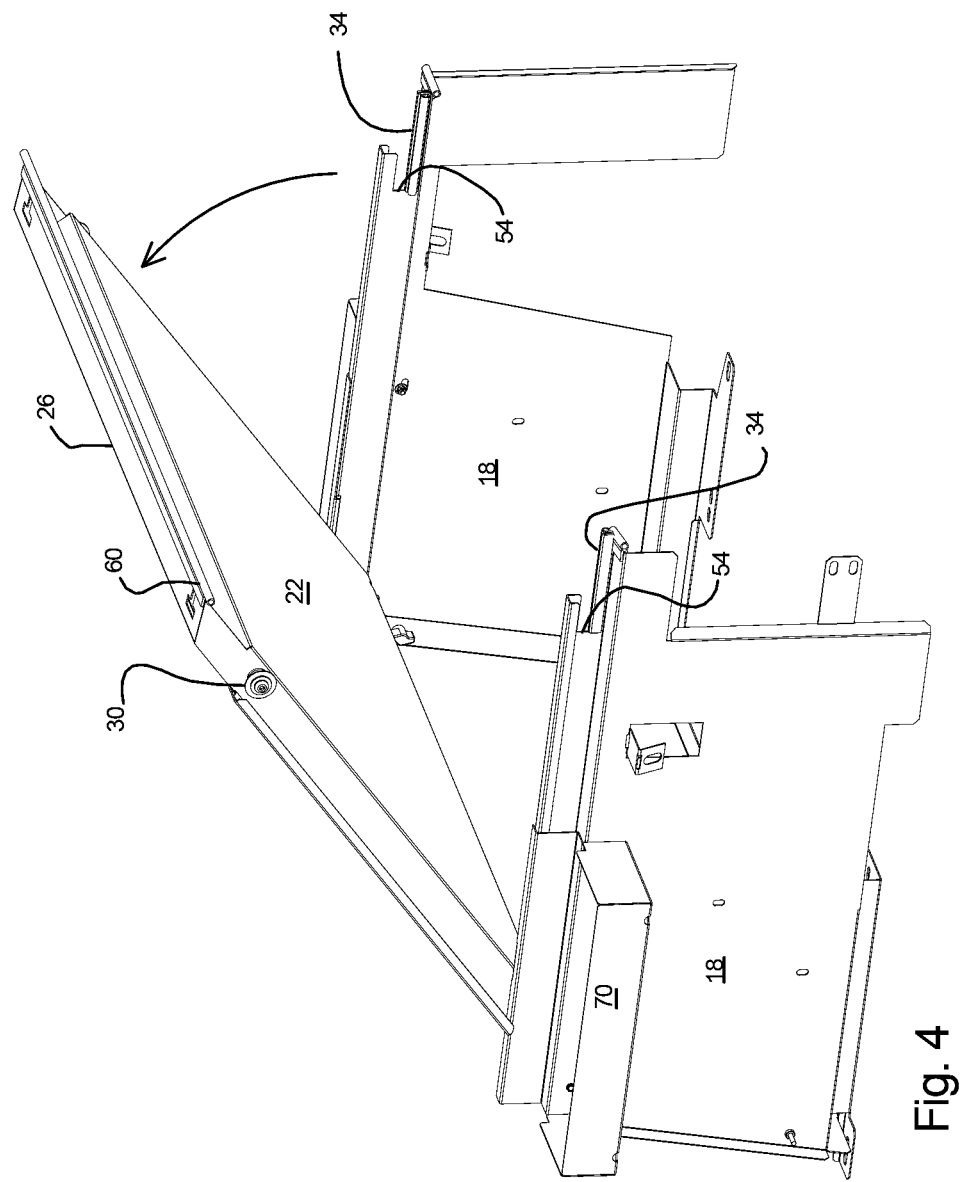
FIG. 4 illustrates the lifting of the top panel to provide access to the storage space.
Figure 7:
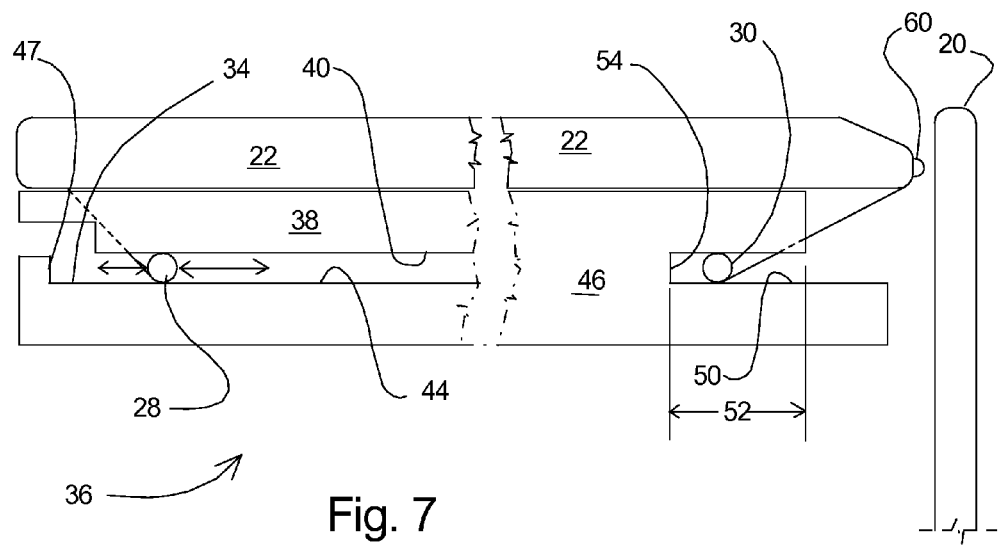
FIG. 7 is a schematic of an example of the arrangement of the components of the locking mechanism disclosed here.
Figure 8:
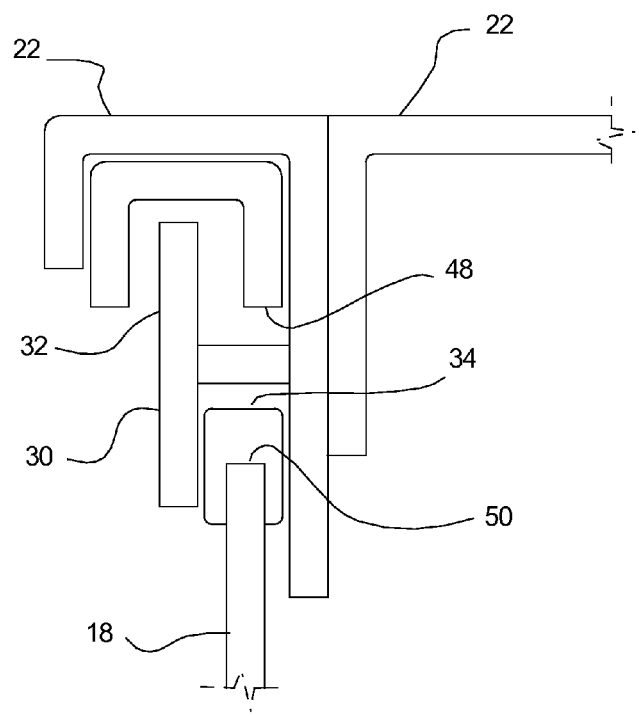
FIG. 8 is a section taken from FIG. 2 at the arrows marked 8-8, and illustrates an example of a bushing and aperture cooperation and mounting of the bushing from the top panel.

FIGS. 2-7 also illustrate that the top panel 22 includes a forward bushing 28 that is mounted from the top panel 22 at a location near the forward edge 24 of the top panel 22. It is important to note that the term "bushing" is intended to encompass an item or devices that facilitates movement along a surface. In the preferred embodiment illustrated in FIGS. 2-6, a nylon bushing is used, which allows sliding. Similarly, it is contemplated that brass bushings or other sliding bearings or rollers or wheels may be used. Also, the top panel 22 will incorporate an aft bushing 30 that is mounted from the top panel 22 at a location near the aft edge 26 of the top panel 22. FIGS. 3 and 8 illustrate that the bushings, specifically the forward bushing 28 and the aft bushing 30, will preferably incorporate a nylon bushing 32 or another sliding element that facilitates the movement along a surface 34, which will be used as part of a locking mechanism 36 disclosed here.

The disclosed invention takes advantage of the mobility of the top panel 22 to create the locking mechanism 36 for securing contents held within the storage enclosure 10. According to a preferred example of the invention, the locking mechanism 36 uses a forward plate 38 having a forward aperture 40 with at least one side 42 that has been adapted for accepting the forward bushing 28. The side 42 of the forward aperture 40 will preferably extend from near the forward edge 24 of the top panel 22 towards the aft edge of the top panel 22. Additionally, the forward plate 38 may be an integral part of at least one of the spaced apart sidewalls 18, or may be a separate plate that is mounted to one of the sides of the bed of a pickup truck, for example.

As illustrated in FIGS. 5 and 6 the forward plate 38 is of integral, one-piece construction with the sidewall 18, and the side 42 of the forward aperture 40 includes a travel portion 44 that extends from near the forward edge 24 of the top panel 22 towards the aft edge 26 of the top panel 22. The forward aperture 40 retains the forward bushing 28 as it moves along the travel portion 44. FIGS. 5 and 6 also show that the forward aperture 40 also preferably includes a release aperture 45 that allows the forward bushing 28 to be removed from the forward plate 38. As illustrated in FIG. 6, the forward aperture 40 may include a forward stop 47 next to the release aperture 45. Thus, it is preferred that the forward aperture be a slot of uniform width, and that the release aperture 45 may be a slot that extends from the forward aperture 40.

Thus, by reviewing the accompanying figures, it will be understood by varying the relationship between the tailgate 20 and the resilient member one can vary how securely the top panel 22 is retained over the sidewalls 18. By adjusting the position of the storage enclosure 10 relative to the tailgate 20 one may adjust the relationship between the aft stop 54 and the aft bushing 30, such that the aft bushing 30 bears against the aft stop 54 when the tailgate 20 is closed and bearing against the resilient member 60. It is also contemplated that the aft aperture 48 may be angled upward or include a curved shape so that insertion of the aft bushing 30 into the aft aperture 48 will result in allowing gravity to cause the aft bushing to migrate towards the aft stop 54.

FIGS. 2-7 also illustrate that the locking mechanism 36 also includes an aft plate 46 that is connected to the forward plate 38. The aft plate 46 may be a separate piece that is attached to sides of the bed of a pickup truck and thus being connected to the forward plate 38 through the side of the bed of the pickup truck. However, in the preferred example of the invention, the aft plate 46 is of integral, one-piece construction with the one of the sidewalls 18. Most preferably, the aft plate 46 and the forward plate 38 will be of integral, one-piece construction with one of the spaced apart sidewalls 18.

Thus, FIGS. 5 and 6 illustrate that the aft plate 46 will include an aft aperture 48 that has been adapted for accepting the aft bushing 30. FIGS. 5-7 illustrate that the aft aperture 48 includes an aft aperture travel portion 50 of a length 52, and that the aft aperture 48 extends between the forward edge 24 and the aft edge 26, and includes an aft stop 54 that limits the amount of travel of the aft bushing 30 can travel in the direction of the forward aperture 40. Thus, as illustrated in FIGS. 2 and 7, the stop 54 allows the aft bushing 30 to travel forward along the aft aperture 48 until the stop 54 prevents the aft bushing 30 from advancing further forward, towards the forward plate 38. This in turn also prevents the forward bushing 28, which is riding within the forward aperture 40, from reaching the release aperture 45, which prevents the release of the forward bushing 28 from the forward aperture 40.

Thus, the enclosed figures illustrate that the stop 54 will be positioned in the aft aperture 48 at a location where the forward bushing 28 is prevented from fully entering the release aperture 45. In the illustrated preferred embodiments of the invention, the relationship between the forward bushing 28 and the aft bushing 30 is maintained by the fixed connection between the forward bushing 28, the aft bushing 30, and the top panel 22.

Referring now to FIGS. 4-7 it will be understood that removal of the top panel 22 from the locking mechanism 36 is accomplished by moving the top panel 22 in an aft direction until the aft bushing 30 moves out of the aft aperture 48, allowing access to the cargo area 14. Once the aft bushing 30 is removed from the aft aperture 48, the user will be able to lift the aft edge 26 of the top panel 22, removing the aft bushing 30 from the aft aperture 48, and thus allowing the top panel 22 to then be moved forward to a position where the forward bushing 28 may be removed from the forward aperture 40 through the release aperture 45, allowing complete removal top panel. Thus, limiting the aft movement of the aft bushing 30 within the aft aperture 48 allows control of access to the cargo area 14. In the disclosed invention the limitation or restriction of the movement of the top panel 22 in an aft direction is accomplished by closing the tailgate 20, so that the tailgate bears against the aft edge 26 of the top panel 26 or is close to the aft edge as illustrated in FIGS. 1 and 7.

It is contemplated that if the storage enclosure 10 is positioned in the vehicle 12 such that edge aft 26 comes into contact with the tailgate 20 when the tailgate is closed, then it would be advantageous to incorporate a resilient member 60, such as a rubber strip, bumper, or spring-backed member, as part of the aft edge 26. Still further, in this type of an arrangement, the compression of the resilient member 60 would urge the aft bushing 30 against the aft stop 54 once the tailgate 20 is closed against the resilient member 60.

It will be understood that the disclosed arrangement incorporates the forward aperture 40 and the aft aperture 48 into the spaced apart sidewalls 18 or into separate plates that are attached at the required position on the sides of the bed of a vehicle. Also, the forward bushing 28 and the aft bushing 32 are mounted from the top panel 22. However, it is contemplated that the bushings may be mounted on the spaced apart sidewalls, and the slots or apertures be integrated into walls that extend down from the top panel. The preferred arrangement offers advantages in terms of accessibility and safety once the top panel is opened.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A device for creating a storage enclosure in a vehicle, the vehicle having a cargo area, the cargo area being defined by a floor a pair of spaced apart sides, and a tailgate that is adapted for extending up from the floor and between the spaced apart sides, the device comprising:
   a top panel having forward edge and an aft edge, the top panel further comprising a forward bushing mounted from the top panel at a location near the forward edge, and an aft bushing that is mounted from the top panel at a location near the aft edge; and
   a locking mechanism comprising:
   a forward plate having a forward aperture having a forward travel portion of a forward aperture travel length and is adapted for accepting the forward bushing, the travel portion of the forward aperture extending from near the forward edge towards the aft edge;
   an aft plate that is in a fixed relation to the forward plate, the aft plate having an aft aperture that is adapted for accepting the aft bushing, the aft aperture having an aft aperture travel portion of an aft aperture travel length that is shorter than the forward aperture travel length, the aft aperture extending between the forward aperture and the aft edge;
   so that the top panel is retained from the locking mechanism by inserting the forward bushing into the forward aperture and then moving the top panel and forward bushing in an aft direction to insert the aft bushing into the aft aperture, so that moving the top panel forward while forward busing and the aft bushing are in the respective forward aperture and the aft aperture results in locking the top panel from the pair of spaced apart sides when the tailgate extends between the spaced apart sides.

2. The device of claim 1 wherein said forward plate and said aft plate are of integral one-piece construction.

3. The device of claim 2 wherein said forward aperture is a slot of uniform width, and a release aperture being a slot that extends away from the forward aperture.

* * * * *